US008553703B2

(12) United States Patent
Del Prado Pavon et al.

(10) Patent No.: US 8,553,703 B2
(45) Date of Patent: Oct. 8, 2013

(54) IEEE 802.11E MAC SIGNALING TO SUPPORT SCHEDULE QOS

(75) Inventors: Javier Del Prado Pavon, Ossining, NY (US); Sai Shankar Nandagopalan, Tarrytown, NY (US)

(73) Assignee: Koninklijke Philips N.V., Eindhoven (NL)

( * ) Notice: Subject to any disclaimer, the term of this patent is extended or adjusted under 35 U.S.C. 154(b) by 1486 days.

(21) Appl. No.: 10/534,418

(22) PCT Filed: Oct. 27, 2003

(86) PCT No.: PCT/IB03/04751
§ 371 (c)(1),
(2), (4) Date: May 6, 2005

(87) PCT Pub. No.: WO2004/043009
PCT Pub. Date: May 21, 2004

(65) Prior Publication Data
US 2006/0014492 A1    Jan. 19, 2006

Related U.S. Application Data

(60) Provisional application No. 60/425,093, filed on Nov. 8, 2002, provisional application No. 60/482,953, filed on Jun. 27, 2003.

(51) Int. Cl.
*H04L 12/28* (2006.01)
(52) U.S. Cl.
USPC ............. 370/395.4; 370/395.21; 370/338; 370/329; 455/67.11; 455/452.2; 455/41.2
(58) Field of Classification Search
USPC ............ 370/229, 328, 338, 395.4, 468, 469, 370/448, 449; 455/41.2, 450–452.2, 426.1
See application file for complete search history.

(56) References Cited

U.S. PATENT DOCUMENTS

| 6,463,307 | B1 * | 10/2002 | Larsson et al. ............... 455/574 |
| 6,804,222 | B1 * | 10/2004 | Lin et al. ..................... 370/338 |
| 6,862,270 | B1 * | 3/2005 | Ho ............................. 370/328 |
| 6,950,397 | B1 * | 9/2005 | Ho et al. ..................... 370/235 |
| 6,970,422 | B1 * | 11/2005 | Ho et al. ..................... 370/230 |

(Continued)

FOREIGN PATENT DOCUMENTS

| EP | 1 309 139 A1 | 5/2003 |
| WO | WO 03 043266 A1 | 5/2003 |

OTHER PUBLICATIONS

"QoS Signaling for Parameterized Traffic in IEEE 802.11E Wireless LANs", by Sai Shankar et al., Aug. 2002, pp. 67-83.

*Primary Examiner* — Sharad Rampuria
(74) *Attorney, Agent, or Firm* — Larry Liberchuk

(57) ABSTRACT

The Station Management Entity (SME) 202 and/or Media Access Control (MAC) SubLayer Management Entity (MLME) 201 within a Hybrid Controller (HC) or wireless station (WSTA) 106, 109 for an IEEE 802.11 wireless data communications system 100 employ primitives in connection with a Schedule Quality of Service (QoS) Action frame. The primitives include: a request primitive formulated by the HC's SME 202 using the WSTA 106, 109 address and the Schedule Element from the Schedule QoS Action frame for transmission to the HC's MLME 201; a confirm primitive formulated by the HC's MLME 201 using a result code for transmission to the HC's SME 202; and an indication primitive formulated by the WSTA's MLME 201 using the Schedule Element for transmission to the WSTA's SME 202.

16 Claims, 3 Drawing Sheets

(56) References Cited

U.S. PATENT DOCUMENTS

Figure 1:
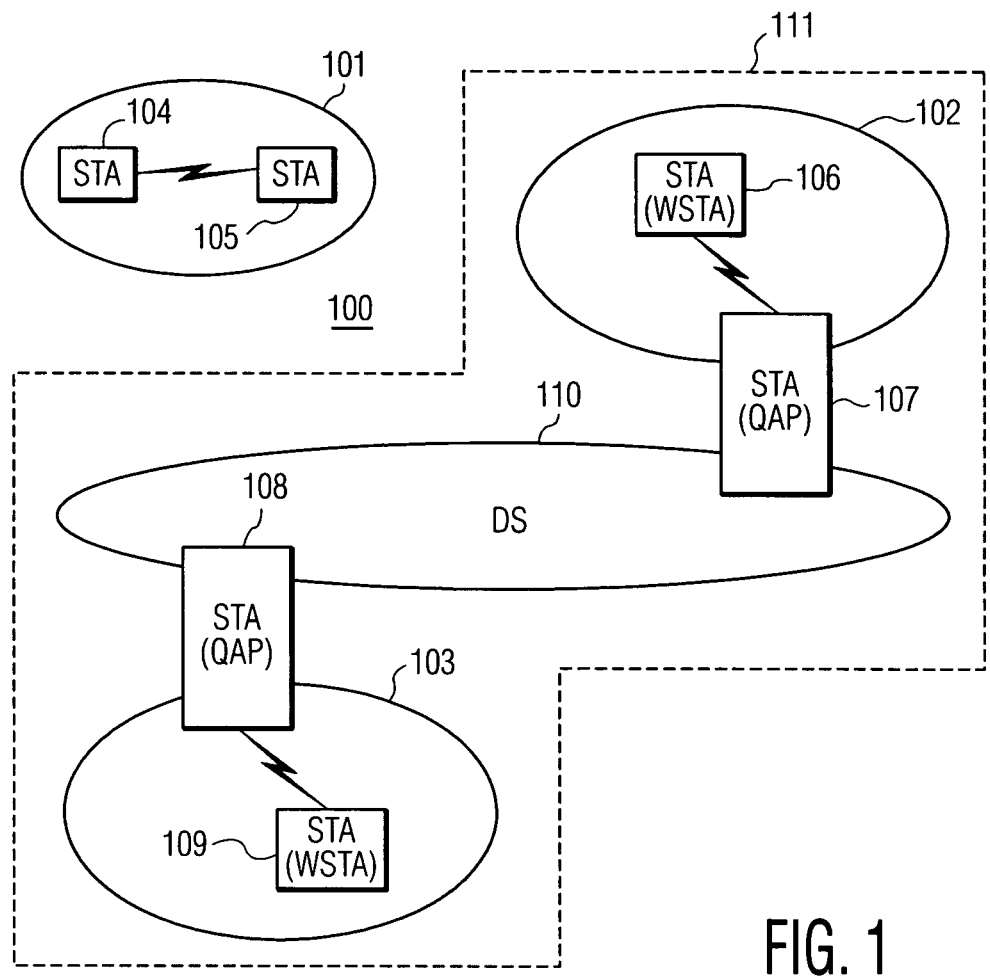

| | | |
|---|---|---|
| 6,985,465 B2 * | 1/2006 | Cervello et al. ............... 370/333 |
| 6,999,442 B1 * | 2/2006 | Ho et al. ....................... 370/338 |
| 7,031,287 B1 * | 4/2006 | Ho et al. ....................... 370/338 |
| 7,187,668 B2 * | 3/2007 | Kandala ......................... 370/338 |
| 7,221,681 B2 * | 5/2007 | Choi et al. .................... 370/447 |
| 7,251,218 B2 * | 7/2007 | Jorgensen .................... 370/235 |
| 7,330,472 B2 * | 2/2008 | Kowalski .................. 370/395.21 |
| 7,349,433 B2 * | 3/2008 | Ho ................................ 370/469 |
| 7,519,032 B2 * | 4/2009 | Soomro et al. ................ 370/338 |
| 7,995,583 B2 * | 8/2011 | Del Prado Pavon et al. ........................ 370/395.21 |
| 2003/0081547 A1 * | 5/2003 | Ho ................................ 370/229 |
| 2003/0081583 A1 * | 5/2003 | Kowalski ...................... 370/338 |
| 2003/0214905 A1 * | 11/2003 | Solomon et al. .............. 370/229 |
| 2004/0071154 A1 * | 4/2004 | Wentink ........................ 370/448 |
| 2004/0184475 A1 * | 9/2004 | Meier ............................ 370/449 |
| 2005/0174973 A1 * | 8/2005 | Kandala et al. ............... 370/338 |
| 2006/0056296 A1 * | 3/2006 | Nandagopalan et al. ..... 370/230 |

\* cited by examiner

IEEE 802.11E MAC SIGNALING TO SUPPORT SCHEDULE QOS

This application claims the benefit of the filing date of provisional U.S. patent application Ser. No. 60/425,093 filed Nov. 8, 2002 and provisional U.S. patent application Ser. No. 60/482,953 filed Jun. 27, 2003 both of which are incorporated herein by reference.

The present invention relates generally to wireless data communications system and, more particularly, ensuring quality-of-service (QoS) in wireless data communications systems.

Wireless local area networks (WLANs) for data communications are currently most commonly implemented according to the Institute of Electrical and Electronic Engineers (IEEE) 802.11-1999 standard, often referred to as "wireless fidelity" or "WiFi". A number of working groups are currently developing modifications and extensions to the standard for various purposes. In particular, the IEEE 802.11 Working Group's Medium Access Control (MAC) Enhancements task group (Task Group E) is working to incorporate quality of service (QoS) into wireless local area networks for high quality delivery of video, voice and multimedia (see IEEE 802.11e QoS draft D3.3).

In the Distributed Coordination Function (DCF) mode in the Contention Period (CP) of each superframe, IEEE 802.11 systems employ a contention access scheme based on carrier sense multiple access with collision avoidance (CSMA/CA), a random access protocol that is not particularly well-suited for time-sensitive traffic. In the Point Coordination Function (PCF) mode during the optional Contention Free Period (CFP) of each superframe, IEEE 802.11 systems employ polling access mechanism with a Point Coordinator (PC), typically co-located with the Access Point (AP), to provide centralized control over bandwidth allocation.

To support QoS applications, IEEE 802.11e adds a new mode called the Hybrid Coordination Function (HCF). HCF combines two access mechanisms: an Enhanced Distributed Coordination Function (EDCF) based on CSMA/CA and providing differentiated (priority-based) control of access to the medium for QoS-capable stations (QSTAs) and a polling based mode in which a Hybrid Controller (HC), typically co-located with the QoS-capable access point (QAP), utilizes the highest medium access priority and polling to provide centralized scheduling during both the CP and CFP periods based on traffic and the QoS requirements of each active connection.

Medium access control through centralized scheduling and polling rather than random access facilitates peer-to-peer communication and provides stations with advance notice of expected transmission and reception. There is, therefore, a need in the art for improvements to scheduling within quality of service enhanced media access control.

To address the above-discussed deficiencies of the prior art, it is a primary object of the present invention to provide, for use in the Station Management Entity (SME) and/or Media Access Control (MAC) SubLayer Management Entity (MLME) within a Hybrid Controller (HC) or wireless station (WSTA) for an IEEE 802.11 wireless data communications system, primitives for use in Quality of Service (QoS) Schedule Element management procedures in connection with a Schedule Quality of Service (QoS) Action frame. The primitives include: a request primitive formulated by the HC's SME using the WSTA address and the Schedule Element from the Schedule QoS Action frame for transmission to the HC's MLME; a confirm primitive formulated by the HC's MLME using a result code for transmission to the HC's SME; and an indication primitive formulated by the WSTA's MLME using the Schedule Element for transmission to the WSTA's SME. Other technical advantages will be readily apparent to one skilled in the art from the following figures, description, and claims.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

Figure 2:
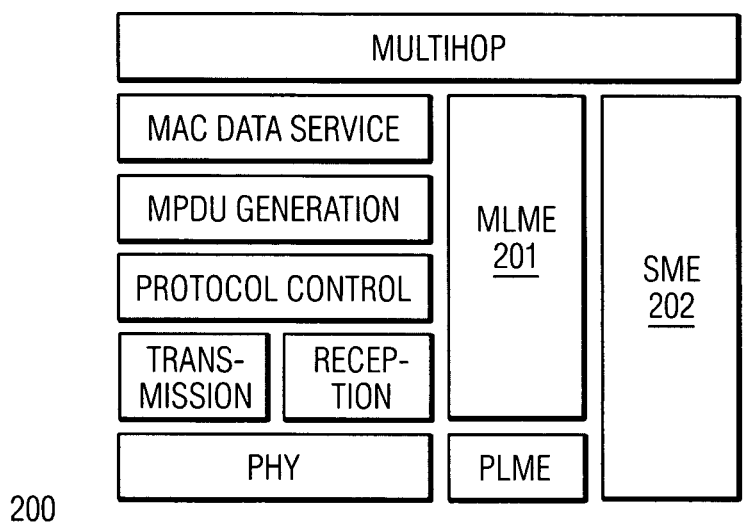
Figure 3A:
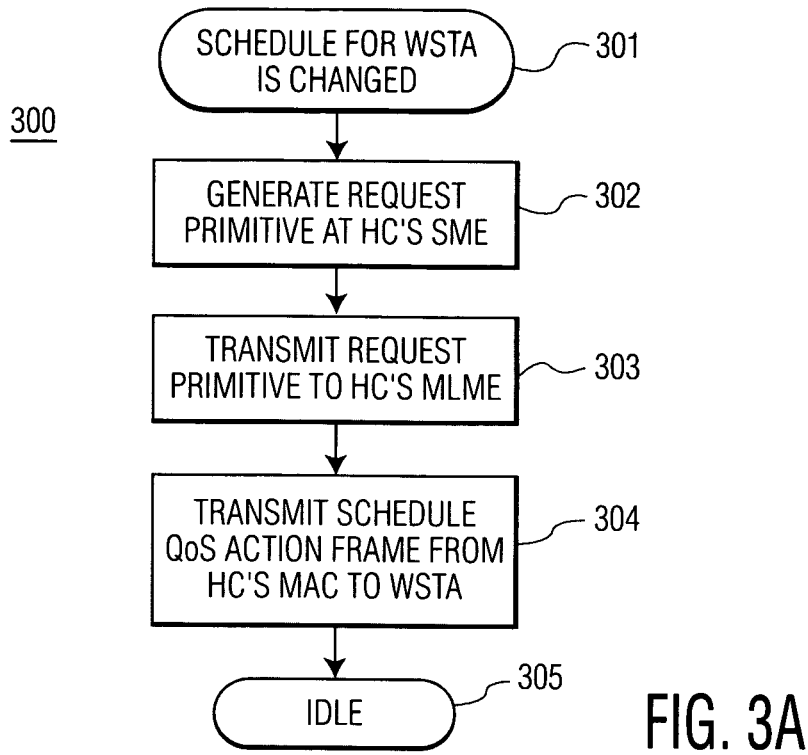
Figure 3B:
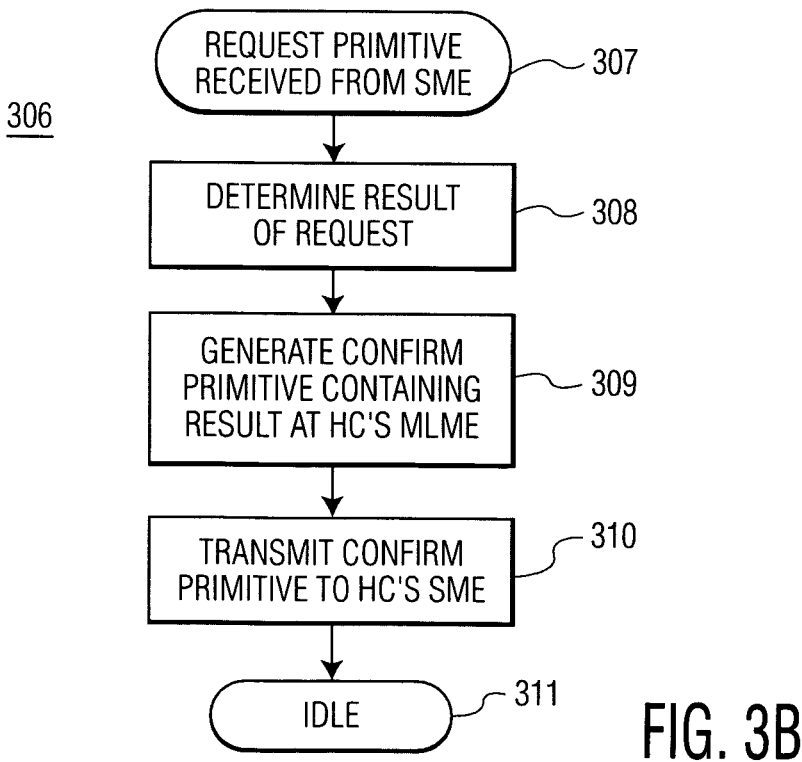
Figure 3C:
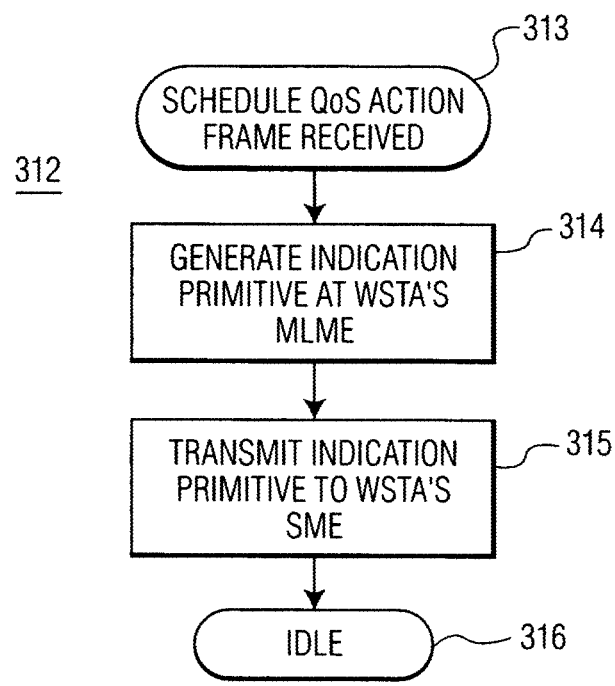

For a more complete understanding of the present invention, and the advantages thereof, reference is now made to the following descriptions taken in conjunction with the accompanying drawings, wherein like numbers designate like objects, and in which:

FIG. 1 depicts a wireless communications system employing media access control signaling to support transmission/reception of schedule quality of service action frames according to one embodiment of the present invention;

FIG. 2 depicts in greater detail wireless communications system elements employed in media access control signaling providing support for transmission/reception of schedule quality of service action frames according to one embodiment of the present invention; and FIGS. 3A-3C are high level flowcharts illustrating processes of media access control signaling supporting transmission/reception of schedule quality of service action frames according to one embodiment of the present invention.

FIGS. 1 through 3C, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device.

FIG. 1 depicts a wireless communications system employing media access control signaling to support transmission/reception of schedule quality of service action frames according to one embodiment of the present invention. Wireless communications system 100 is implemented in accordance with the IEEE 802.11 standard, with the additional quality of service (QoS) functionality and/or modifications specified in the IEEE 802.11e standard and those described in further detail below. Accordingly, wireless communications system 100 in the exemplary embodiment includes a plurality of wireless networks 101, 102 and 103, each comprising a basic service set (BSS) network including a number of stations (STAs) 104-105, 106-107 and 108-109, respectively, in wireless communication with each other. Wireless network 101 includes only stations 104-105 in wireless communication with each other and each providing station services (SS) such as (open system or shared key) authentication services, deauthentication services, and (optional) privacy services utilizing the wired equivalent privacy (WEP) algorithm and data delivery. Wireless network 101 thus forms an independent basic service set (IBSS) network.

Wireless networks 102 and 103, on the other hand, each include at least one station 107 and 108, respectively, serving as an access point (AP) to a distribution system (DS) 110 linking the two wireless networks 102 and 103. Distribution system 110 may be any suitable means by which access points communicate with one another to exchange frames for stations within their respective basic service set networks, forward frames to follow mobile stations moving from one basic service set network to another, and optionally exchange frames with an external/wired network (Integration Service). Distribution system 110 may thus be, for example, a wired local area network (LAN) such as an IEEE 802.X network, where X denotes a non-IEEE 802.11 standard applicable to wired networks, or an IEEE 803.2 network.

While stations 106 and 109 in wireless networks 102 and 103 provide only station service like stations 104-105 in wireless network 101, stations 107 and 108 in wireless networks 102 and 103 provide both station service and, in conjunction with distribution system 110, distribution system services (DSS) such as association, disassociation, re-association, distribution and integration. Wireless networks 102 and 103 therefore form infrastructure basic service set networks and, together with distribution system 110, an extended service set (ESS) network 111.

In accordance with IEEE 802.11, wireless communications within wireless networks 101-103 employ a media access control (MAC) layer and a physical (PHY) layer to provide asynchronous, best-effort, connectionless data delivery utilizing carrier sense multiple access with collision avoidance (CSMA/CA). As noted above, wireless networks 102-103 in the present invention also conform to the IEEE 802.11e Draft 3.3 standard, including the modifications specified in document IEEE 802.11-02/650r0 (November 2002). Accordingly, stations 107 and 108 are QoS-capable access points (QAPs) and stations 106 and 109 are QoS-capable stations (WSTAs).

Those skilled in the art will recognize that the full structure and operation of a wireless system is not depicted or described in complete detail. Instead, for simplicity and clarity, only so much of the structure and operation of wireless networks as is unique to the present invention or necessary for an understanding of the present invention is depicted and described herein.

FIG. 2 depicts in greater detail wireless communications system elements employed in media access control signaling providing support for transmission/reception of schedule quality of service action frames according to one embodiment of the present invention. The layered system 200, which is employed both for the Hybrid Controller (HC) implemented, in the exemplary embodiment, within one of QAPs 107-108 and for a wireless station (WSTA) of interest, includes a MAC Sub-Layer Management Entity (MLME) 201 and a Station Management Entity (SME) 202. SME 202 is a logical entity capable of communicating with all layers in the network stack—i.e., the physical (PHY) layer, the MAC layer, etc. MLME 201 manages the MAC layer and controls interactions with SME 202, communicating with SME 202 by intra-station communications and with the MLME for other stations by inter-station communications.

As part of scheduling QoS transmissions, the HC transmits Schedule QoS Action frames including a Schedule Element to the corresponding WSTA, as specified in the above-mentioned document IEEE 802.11-02/650r0, the content of which is incorporated herein by reference. In accordance with the present invention, management processes associated with formulating and/or acting on the QoS Schedule Element within those schedule QoS action frames involves use of one or more of signaling primitives MLME-SCHEDULE.request, MLME-SCHEDULE.confirm, and MLME-SCHEDULE.indication as described in further detail below.

The MLME-SCHEDULE.request primitive is valid at the HC and requests transmission of a Schedule QoS Action frame, and includes the parameters:

| MLME-SCHEDULE.request | ( |
| --- | --- |
| | WSTA Address |
| | Schedule Element |
| | ) | where the permissible parameter values are summarized in TABLE I:

TABLE I

| Name | Type | Valid Range | Description |
| --- | --- | --- | --- |
| WSTA Address | MAC Address | Any valid individual address | MAC Address of the WSTA to which the Schedule QoS Action frame shall be sent |
| Schedule Element | As defined in frame format | As defined in frame format | Specifies the schedule for the WSTA, including the Service Interval (min and max), TXOP duration (min and max) and Specification Interval |

The MLME-SCHEDULE.request signaling primitive is generated by the SME 202 at the HC to send scheduling information, in the form of a Schedule QoS Action frame, from the MLME 201 to a specified WSTA when the Schedule Information for the WSTA is changed.

The MLME-SCHEDULE.confirm primitive reports the results of a MLME-SCHEDULE.request, and includes the parameters:

| MLME-SCHEDULE.confirm | ( |
| --- | --- |
| | ResultCode |
| | ) | where the permissible parameter values are summarized in TABLE II:

TABLE II

| Name | Type | Valid Range | Description |
| --- | --- | --- | --- |
| ResultCode | Enumeration | SUCCESS INVALID PARAMETERS UNSPECIFIED FAILURE | Indicates the results of the corresponding MLME-SCHEDULE.request |

The MLME-SCHEDULE.confirm signaling primitive is generated by the MLME 201 as a result of an MLME-SCHEDULE.request, when the action completes, to notify the SME 202 of the result of the MLME-SCHEDULE.request (e.g., if the result is SUCCESS, the Schedule Element has been correctly sent by the HC to the WSTA in the Schedule QoS Action Frame.

The MLME-SCHEDULE.indication primitive is valid at the WSTA and reports the reception of a new Schedule by the WSTA in the form of a Schedule QoS Action frame, and includes the parameters:

| MLME-SCHEDULE.indication | ( Schedule Element ) |
|---|---| where the permissible parameter values are summarized in TABLE III:

TABLE III

| Name | Type | Valid Range | Description |
|---|---|---|---|
| Schedule Element | As defined in frame format | As defined in frame format | Specifies the schedule for the WSTA, including the Service Interval (min and max), TXOP duration (min and max) and Specification Interval |

The MLME-SCHEDULE.indication signaling primitive is generated by the MLME 201 as a result of receipt of a new Schedule in the form of a Schedule QoS Action frame, to notify the SME 202 of the receipt of QoS Schedule in the form of a Schedule QoS Action frame. The new Schedule Element parameters overwrite previously stored values.

FIGS. 3A through 3C are high level flowcharts illustrating processes of media access control signaling supporting transmission/reception of schedule quality of service action frames according to one embodiment of the present invention. FIG. 3A illustrates use of the request primitive (MLME-SCHEDULE.request). The process 300 begins with a schedule change occurring for a wireless station participating in the data communications network including the hybrid controller (step 301). The HC's SME generates the request primitive (step 302) and transmits the primitive to the HC's MLME (step 303). The HC's MLME then formulates a Schedule Element and a Schedule QoS Action frame containing the Schedule Element, and transmits the formulated Schedule QoS Action frame from the HC's MAC to the WSTA (step 304). The process 300 then becomes idle until another schedule change occurs for a participating wireless station.

FIG. 3B illustrates use of the confirm primitive (MLME-SCHE-DULE.confirm). The process 306 begins with a request primitive being transmitted by the HC's SME and received by the HC's MLME (step 307). The result produced by the request is determined (step 308), then a confirm primitive containing the result is formulated by the HC's MLME (step 309) and transmitted to the HC's SME (step 310). The process 306 then becomes idle until another request primitive is received.

FIG. 3C illustrates use of the indication primitive (MLME-SCHE-DULE.indication). The process 312 begins with a Schedule QoS Action frame being received by the MLME for a WSTA (step 313). An indication primitive containing the Schedule Element from the received Schedule QoS Action frame is formulated by the WSTA's MLME (step 314) and transmitted to the WSTA's SME (step 315). The process 312 then becomes idle until another Schedule QoS Action frame is received.

The present invention provides signaling primitives for management processes required within the MLME of an HC or WSTA required to handle the Schedule Element within a Schedule QoS Action frame.

It is important to note that while the present invention has been described in the context of a fully functional system, those skilled in the art will appreciate that at least portions of the mechanism of the present invention are capable of being distributed in the form of a machine usable medium containing instructions in a variety of forms, and that the present invention applies equally regardless of the particular type of signal bearing medium utilized to actually carry out the distribution. Examples of machine usable mediums include: nonvolatile, hard-coded type mediums such as read only memories (ROMs) or erasable, electrically programmable read only memories (EEPROMs), recordable type mediums such as floppy disks, hard disk drives and compact disc read only memories (CD-ROMs) or digital versatile discs (DVDs), and transmission type mediums such as digital and analog communication links and frames or packets.

Although the present invention has been described in detail, those skilled in the art will understand that various changes, substitutions, variations, enhancements, nuances, gradations, lesser forms, alterations, revisions, improvements and knock-offs of the invention disclosed herein may be made without departing from the spirit and scope of the invention in its broadest form.

The invention claimed is:

1. A Hybrid Controller (HC) for an IEEE 802.11 wireless data communications system supporting quality of service (QoS) enhancements, comprising:
   a Station Management Entity (SME) within the HC; and
   a Media Access Control (MAC) SubLayer Management Entity (MLME) within the HC and communicably coupled both to the SME and to MLMEs for wireless stations (WSTAs) participating in the IEEE 802.11 wireless data communications system,
   wherein responsive to a schedule change for one of the participating WSTAs, the SME within the HC generates a request primitive for transmission to the MLME within the HC, and wherein the request primitive includes an address for the one of the participating WSTAs and a Schedule Element that specifies the schedule for the one of the participating WSTAs, and
   wherein, responsive to a request primitive relating to a schedule change for one of the participating WSTAs, the MLME within the HC determines a result for the request primitive and generates a confirm primitive for transmission to the SME within the HC.

2. The HC according to claim 1, wherein the SME transmits the request primitive to the MLME within the HC.

3. The HC according to claim 2, wherein, responsive to receiving the request primitive from the SME, the MLME formulates a Schedule QoS Action frame including the Schedule Element and transmits the formulated Schedule QoS Action frame.

4. A wireless data communications system including the HC according to claim 1, the wireless data communications system further comprising:
   a MLME within the one of the participating WSTAs,
   wherein the MLME within the one of the participating WSTAs, responsive to receipt of the Schedule QoS Action frame by the one of the participating WSTAs, generates an indication primitive for transmission to an SME within the one of the participating WSTAs.

5. The wireless data communications system according to claim 4, wherein the indication primitive includes the Schedule Element.

6. The HC according to claim 1, wherein the confirm primitive includes a result code corresponding to the result for the request primitive.

7. The HC according to claim 6, wherein the MLME within the HC transmits the confirm primitive to the SME within the HC.

8. The system according to claim 4 wherein the indication primitive includes a Schedule Element from the Schedule QoS Action frame.

9. The system according to claim 8, wherein the MLME within the WSTA transmits the indication primitive to the SME within the WSTA.

10. A method of supporting quality of service (QoS) enhancements within a Hybrid Controller (HC) for an IEEE 802.11 wireless data communications system, comprising:
   operating a Station Management Entity (SME) within the HC;
   operating a Media Access Control (MAC) SubLayer Management Entity (MLME) within the HC and communicably coupled both to the SME and to MLMEs for wireless stations (WSTAs) participating in the IEEE 802.11 wireless data communications system;
   responsive to a schedule change for one of the participating WSTAs, generating a request primitive for transmission from the SME within the HC to the MLME within the HC, wherein the request primitive includes an address for the one of the participating WSTAs and a Schedule Element that specifies the schedule for the one of the participating WSTAs; and
   responsive to a request primitive relating to a schedule change for one of the participating WSTAs, determining a result for the request primitive and generating a confirm primitive for transmission from the MLME within the HC to the SME within the HC.

11. The method according to claim 10, further comprising:
   transmitting the request primitive from the SME to the MLME within the HC.

12. The method according to claim 11, further comprising:
   responsive to receiving the request primitive from the SME, formulating a Schedule QoS Action frame including the Schedule Element; and
   transmitting the formulated Schedule QoS Action frame.

13. The method according to claim 12, further comprising:
   responsive to receipt of the Schedule QoS Action frame by the one of the participating WSTAs, generating an indication primitive for transmission to an SME within the one of the participating WSTAs.

14. The method according to claim 13, wherein the indication primitive includes the Schedule Element.

15. The method according to claim 10, wherein the confirm primitive includes a result code corresponding to the result for the request primitive.

16. The method according to claim 15, further comprising:
   transmitting the confirm primitive from the MLME within the HC to the SME within the HC.

* * * * *